Patented Aug. 25, 1936

2,052,145

UNITED STATES PATENT OFFICE 2,052,145

METHOD FOR THE PREPARATION OF ARALKYL ETHERS OF CELLULOSE

Eugene J. Lorand, Wilmington, Del., assignor to Hercules Powder Company, Wilmington, Del., a corporation of Delaware No Drawing. Application May 11, 1934, Serial No. 725,078

9 Claims. (Cl. 260—152)

This invention relates to a method for the preparation of aralkyl ethers of cellulose.

As is well known, aralkyl ethers of cellulose are produced by the action of an aralkyl halide, such as, for example, benzyl chloride, upon alkali cellulose in the presence of free alkali. During the course of the aralkylation reaction the concentration of free alkali in the reaction mass gradually diminishes and eventually would fall to a point so low that satisfactory aralkylation would no longer take place. It has accordingly been customary either to utilize a very high alkali concentration at the start of the reaction in order to insure that sufficient alkali shall be present throughout the course of the reaction, or to periodically during the reaction add fresh alkali to the reaction mass. The former procedure is disadvantageous in that the high concentration of alkali initially present has a degrading or depolymerizing action on the unconverted alkali cellulose, with the resultant production of inferior aralkyl ethers.

The latter procedure is also disadvantageous in that a large amount of the alkali so introduced is used up in hydrolysis of the aralkyl halide and consequently a large quantity of both these reagents is expended without having any useful effect in the reaction.

Various investigators have realized that it was not necessary to have present in the reaction mixture a large quantity of free alkali if the concentration of free alkali as referred to the aqueous phase could be kept high. It was accordingly suggested that instead of adding fresh alkali to the reaction mixture during the course of the reaction the same effect could be obtained by removing some of the water present by evaporation or distillation. However, if the water is removed by evaporation, a large amount of the aralkyl halide is simultaneously lost, while if the water is to be distilled off, high temperatures, which have a deleterious effect upon the quality of the product or expensive and complicated apparatus must be employed.

It has been found in accordance with this invention, that the excess water may be removed from the reaction mass in a very simple and inexpensive manner without resorting either to high temperatures or to complicated operations. Thus, water may be removed in accordance with the method of this invention without the loss of any substantial quantities of the aralkyl halide.

The method in accordance with this invention is based upon the fact that during the aralkylation reaction the fibres of alkali cellulose, which are strongly hydrophilic, are gradually transformed into fibres of an aralkyl ether of cellulose, which is organophilic and hydrophobic. Accordingly, as the aralkylation reaction progresses the fibres present, which were at first strongly wet by the alkali solution, gradually tend to repel water and to absorb the aralkyl halide present. This results in an actual squeezing out of the water from the fibre mass as the aralkylation reaction progresses. In the customary methods of aralkylation this water is dispersed and emulsified in the aralkyl halide present due to the vigorous agitation employed. It has been found, however, in accordance with this invention that if the reaction mass is subjected only to very mild agitation, or to no agitation at all, this aqueous liquid, which is forced from the fibres during aralkylation, will separate from the rest of the reaction mixture and may be removed therefrom by simple decantation.

The reaction mass, after the separation of this aqueous phase, contains a uniformly etherified cellulose ether, which, however, is only partially etherified and accordingly requires further etherification treatment to produce the final soluble aralkyl ether. This further etherification may be effected in various ways, but will, in any event, require the addition of fresh alkali. Since, however, the partially etherified product is no longer susceptible to degradation by contact with high concentrations of alkali, the further etherification may be carried out at such relatively high concentrations without any danger of degradation of the product.

The method in accordance with this invention may be carried out in connection with any of the usual processes for the aralkylation of cellulose, and with the use of alkali cellulose derived from any suitable cellulosic material, as, for example, purified wood pulp, cotton linters, etc. Of course those processes requiring a high initial concentration of alkali will not be chosen, since such processes, as has been said, degrade the alkali cellulose and the necessity for having a high initial alkali concentration is avoided by the removal of water from the reaction mass during the reaction. The amount of aralkylating agent employed in the reaction in accordance with this invention is of importance, since if too large quantities are used the aqueous solution from the fibres tends to remain dispersed in the aralkylating agent so that separation is made difficult, while if too small quantities of aralkylating agent are employed, the composition of the reaction mixture will be non-uniform and the resulting cellulose ether will not be uniformly etherified. Generally, the aralkylating agent will be employed in amounts of from 100–400% of the amount of alkali cellulose present and preferably in amount from about 170–220% of the amount of alkali cellulose present.

The temperature during the aralkylation reaction involving separation of the aqueous phase may range from about 60° C. up to about 130° C. However, a temperature less than about 100° C. and preferably about 80° C. results in more uniform etherification. These lower temperatures also obviate the necessity for the use of refluxing equipment. Gentle agitation of the reaction mixture is advantageous, but is in no way essential and the reaction may be performed without any agitation. The agitation, if it is desired to be used, may best be that which is provided by revolving drums having suitable baffles arranged in their interior or by a tumbling barrel, or the like. As has been said, vigorous agitation is to be avoided, since it causes dispersion and emulsification of the aqueous material which separates from the fibres during aralkylation.

The time required for good separation of this aqueous phase depends entirely upon the temperature at which the reaction is carried out. For example, it will require only a few hours at or above 100° C. to effect substantially complete separation of the aqueous phase from the fibres, while at 60° C. several days are required. It will be understood that during this stage of the reaction, that is the stage in which the aqueous phase separates from the fibres, no additional alkali need be added to the reaction mass since the separation of the aqueous phase insures the maintenance of a sufficiently high alkali concentration without the addition of fresh alkali.

After the completion of this stage of the reaction and the removal of the aqueous phase which has separated, the reaction mass, which contains a partially etherified cellulose ether, is treated with fresh alkali and at a higher temperature to complete etherification. This second stage of the reaction, which is substantially identical with the normal etherification procedure, will generally be conducted at a temperature of from about 60–130° C., preferably at a temperature of about 110° C. Fresh alkali, either in solid form or in aqueous solution will be added in amounts ranging from about 10–40% of the amount of alkali cellulose originally used, depending upon the character of the final product desired. This fresh alkali may be added all at once or continuously at short intervals during the course of the reaction. If a solution is used, the second stage of the reaction may be conducted by the so-called distillation process described for example, in United States Patent No. 1,920,702 to Lautenberg.

If desired, more aralkylating agent may also be added at this stage, although usually it will not be found necessary. The second stage of the reaction will be continued for from 1–5 hours, and desirably the reaction mass will be vigorously stirred during this stage of the reaction. The reaction is completed when the fibrous form of the alkali cellulose has completely disappeared and no more fibres can be distinguished in the resulting mixture. The cellulose ether is then separated and purified by any of the usual methods.

The following example is illustrative of the method in accordance with this invention in its specific embodiment:

24 grams of purified cotton linters are soaked with 200 cc. of 25% sodium hydroxide solution. After a few hours the mass is pressed to a weight of about 80–100 grams and it is then shredded, placed in the agitating device, which may comprise an Erlenmeyer flask indented on the sides and bottom and adapted to be slowly rotated about its inclined axis, and covered with 160 grams of benzyl chloride. The reaction mass is then heated by means of a water bath to about 70° C. and is slowly rotated for about 18–24 hours. The flask then contains a doughy mass from which about 20–30 cc. of aqueous solution has separated. This aqueous material is removed by decantation and the doughy reaction mixture is removed to a container equipped with some stirring device adapted to give vigorous agitation. The temperature of the reaction is then raised to about 105° C. and the agitation gradually increased. At regular intervals, for example, of 15–30 minutes 3–5 grams of solid sodium hydroxide are added to the reaction mixture. The reaction is completed in from 1½–3 hours with resultant complete dispersion of the fibres. The benzyl cellulose formed may be separated and purified by any of the known methods generally employed in cellulose etherification. The following purification procedure is suitable:

The reaction mass obtained is macerated with from an equal to a double volume of gasoline, which dissolves the benzyl chloride and the organic by-products of the reaction. The benzyl cellulose separates in small crumbs which are washed consecutively with gasoline, alcohol and water. After drying, the product may be extracted with methanol, if desired.

It will be seen that the method in accordance with this invention comprises essentially conducting the first step of the etherification process at a relatively low alkali concentration and in such a manner that the aqueous solution which separates from the fibres during the course of the etherification can be removed from the reaction mass before the final step of the reaction in which fresh alkali is added, is begun.

What I claim and desire to protect by Letters Patent is:

1. The method of producing aralkyl ethers of cellulose which includes the steps of reacting cellulose impregnated with an aqueous alkali solution with an aralkyl halide under conditions adapted to form a partially aralkylated ether of cellulose while maintaining the reaction mixture in a sufficiently quiescent condition that the aqueous solution which separates from the hydrophobic, partially aralkylated ether formed as the reaction proceeds is not dispersed in the reaction mixture, and removing said aqueous solution substantially free from aralkyl halide from the reaction mixture.

2. The method of producing benzyl ethers of cellulose which includes the steps of reacting cellulose impregnated with an aqueous alkali solution with a benzyl halide under conditions adapted to form a partially benzylated ether of cellulose while maintaining the reaction mixture in a sufficiently quiescent condition that the aqueous solution which separates from the hydrophobic, partially benzylated ether formed as the reaction proceeds is not dispersed in the reaction mixture, and removing said aqueous solution substantially free from benzyl halide from the reaction mixture.

3. The method of producing aralkyl ethers of cellulose which includes reacting cellulose impregnated with an aqueous alkali solution with an aralkyl halide under conditions adapted to form a partially aralkylated ether of cellulose while maintaining the reaction mixture in a sufficiently quiescent condition that the aqueous solution which separates from the hydrophobic, partially aralkylated ether formed as the reaction proceeds is not dispersed in the reaction mixture, removing said aqueous solution substantially free from aralkyl halide from the reaction mixture, adding fresh alkali to the reaction mixture, and recovering a substantially completely soluble aralkyl ether of cellulose therefrom.

4. The method of producing aralkyl ethers of cellulose which includes the steps of reacting cellulose impregnated with an aqueous alkali solution with an aralkyl halide under conditions adapted to form a partially aralkylated ether of cellulose while maintaining the reaction mixture in a sufficiently quiescent condition that the aqueous solution which separates from the hydrophobic, partially aralkylated ether formed as the reaction proceeds is not dispersed in the reaction mixture, and removing said aqueous solution substantially free from aralkyl halide from the reaction mixture when the separation of the solution from the partially aralkylated ether is substantially complete.

5. The method of producing aralkyl ethers of cellulose which includes reacting cellulose impregnated with an aqueous alkali solution with an aralkyl halide under conditions adapted to form a partially aralkylated ether of cellulose while maintaining the reaction mixture in a sufficiently quiescent condition that the aqueous solution which separates from the hydrophobic, partially aralkylated ether formed as the reaction proceeds is not dispersed in the reaction mixture, removing said aqueous solution substantially free from aralkyl halide from the reaction mixture when the separation of the solution from the partially aralkylated ether is substantially complete, adding fresh alkali to the reaction mixture, and recovering a substantially completely soluble aralkyl ether of cellulose therefrom.

6. The method of producing aralkyl ethers of cellulose which includes the steps of reacting cellulose impregnated with an aqueous alkali solution with an aralkyl halide under conditions adapted to form a partially aralkylated ether of cellulose while maintaining the reaction mixture in a sufficiently quiescent condition that the aqueous solution which separates from the hydrophobic, partially aralkylated ether formed as the reaction proceeds is not dispersed in the reaction mixture, and removing said aqueous solution substantially free from aralkyl halide from the reaction mixture, the aralkyl halide being present in amount of from about 100% to about 400% by weight of the impregnated cellulose.

7. The method of producing aralkyl ethers of cellulose which includes reacting cellulose impregnated with an aqueous alkali solution with an aralkyl halide under conditions adapted to form a partially aralkylated ether of cellulose while maintaining the reaction mixture in a sufficiently quiescent condition that the aqueous solution which separates from the hydrophobic, partially aralkylated ether formed as the reaction proceeds is not dispersed in the reaction mixture, removing said aqueous solution substantially free from aralkyl halide from the reaction mixture, adding fresh alkali to the reaction mixture, and recovering a substantially, completely soluble aralkyl ether of cellulose therefrom, the aralkyl halide being present in amount of from about 100% to about 400% by weight of the impregnated cellulose.

8. The method of producing aralkyl ethers of cellulose which includes reacting cellulose impregnated with an aqueous alkali solution with an aralkyl halide under conditions adapted to form a partially aralkylated ether of cellulose while maintaining a sufficiently gentle agitation of the reaction mixture that the aqueous solution which separates from the hydrophobic, partially aralkylated ether formed as the reaction proceeds is not dispersed in the reaction mixture, removing said aqueous solution substantially free from aralkyl halide from the reaction mixture, adding fresh alkali to the reaction mixture, and recovering a substantially completely soluble aralkyl ether of cellulose therefrom.

9. The method of producing aralkyl ethers of cellulose which includes reacting cellulose impregnated with an aqueous alkali solution with an aralkyl halide under conditions adapted to form a partially aralkylated ether of cellulose while maintaining a sufficiently gentle agitation of the reaction mixture that the aqueous solution which separates from the hydrophobic, partially aralkylated ether formed as the reaction proceeds is not dispersed in the reaction mixture, removing said aqueous solution substantially free from aralkyl halide from the reaction mixture by decantation, adding fresh alkali to the reaction mixture, and recovering a substantially completely soluble aralkyl ether of cellulose therefrom.

EUGENE J. LORAND.